US012386725B2

(12) United States Patent
Kneib et al.

(10) Patent No.: US 12,386,725 B2
(45) Date of Patent: Aug. 12, 2025

(54) METHOD AND SYSTEM FOR REMOTE VERIFICATION OF THE INTEGRITY OF A COMPUTER PROGRAM IN A COMPUTING UNIT TO BE CHECKED

(71) Applicant: Robert Bosch GmbH, Stuttgart (DE)

(72) Inventors: Marcel Kneib, Ingelheim (DE); Friedrich Wiemer, Burgstetten (DE); Manuel Jauss, Wissgoldingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 135 days.

(21) Appl. No.: 18/184,331

(22) Filed: Mar. 15, 2023

(65) Prior Publication Data

US 2023/0333964 A1 Oct. 19, 2023

(30) Foreign Application Priority Data

Apr. 13, 2022 (DE) ...................... 10 2022 203 720.0

(51) Int. Cl.
*G06F 21/64* (2013.01)
*G06F 11/3604* (2025.01)
(52) U.S. Cl.
CPC ................................ *G06F 11/3612* (2013.01)
(58) Field of Classification Search
CPC ...... G06F 11/3612; G06F 21/57; G06F 21/62; G06F 21/64; G06F 21/71; G06F 21/121
See application file for complete search history.

(56) References Cited

U.S. PATENT DOCUMENTS 6,493,825 B1 * 12/2002 Blumenau ............. G06F 21/602
380/278
8,666,900 B1 * 3/2014 Chan .................... G06Q 30/018
705/76

(Continued)

OTHER PUBLICATIONS

"Secure Hash Standard (SHS)," Federal Information Processing Standards Publication, FIPS Pub 180-4, National Institute of Standards and Technology (NIST), 2015, pp. 1-36. <http://dx.doi.org/10.6028/NIST.FIPS.180-4> Downloaded Mar. 14, 2023.

(Continued)

*Primary Examiner* — Joseph O Schell
(74) *Attorney, Agent, or Firm* — NORTON ROSE FULBRIGHT US LLP

(57) ABSTRACT

A method for remote verification of the integrity of a computer program in a computing unit to be checked using a verification unit. The computer program is specified by a reference program code and is in the form of stored program code in the computing unit to be checked. The method includes: selecting, by the verification unit, a pair from a list of pairs in which each pair includes a random character string and a reference check value calculated using a check value function based on the random character string of the pair and the reference program code; transmitting the random character string of the pair to a validation unit; receiving a comparison check value calculated using the check value function based on the transmitted random character string and the stored program code; comparing the received comparison check value to the reference check value of the selected pair.

15 Claims, 2 Drawing Sheets

(56) References Cited

U.S. PATENT DOCUMENTS

| | | | | |
|---|---|---|---|---|
| 2011/0085667 | A1* | 4/2011 | Berrios | H04L 9/3249 709/203 |
| 2013/0060939 | A1* | 3/2013 | Bauer | G06F 21/54 709/224 |
| 2013/0304711 | A1* | 11/2013 | Resch | G06F 11/3485 707/690 |
| 2017/0235957 | A1* | 8/2017 | Maletsky | H04L 63/0807 713/168 |
| 2020/0264958 | A1* | 8/2020 | Blass | G06F 11/1471 |
| 2021/0286871 | A1* | 9/2021 | Lattin | H04L 9/0869 |
| 2022/0083640 | A1* | 3/2022 | Duval | G06F 21/64 |
| 2023/0362155 | A1* | 11/2023 | Bornheimer | H04L 63/102 |

OTHER PUBLICATIONS

"SHA-3 Standard: Permutation-Based Hash and Extendable-Output Functions," Federal Information Processing Standards Publication, FIPS Pub 202, National Institute of Standards and Technology (NIST), 2015, pp. 1-37. <http://dx.doi.org/10.6028/NIST.FIPS. 202> Downloaded Mar. 14, 2023.

"The Keyed-Hash Message Authentication Code (HMAC)," Federal Information Processing Standards Publication, FIPS Pub 198-1, National Institute of Standards and Technology (NIST), 2008, pp. 1-13. <http://csrc.nist.gov/publications/fips/fips198-1/FIPS-198-1_final.pdf> Downloaded Mar. 14, 2023.

\* cited by examiner

METHOD AND SYSTEM FOR REMOTE VERIFICATION OF THE INTEGRITY OF A COMPUTER PROGRAM IN A COMPUTING UNIT TO BE CHECKED

CROSS REFERENCE

The present application claims the benefit under 35 U.S.C. § 119 of German Patent Application No. DE 10 2022 203 720.0 filed on Apr. 13, 2022, which is expressly incorporated herein by reference in its entirety.

FIELD

The present invention relates to a method for remote verification of the integrity of a computer program in a computing unit to be checked, and to a system for performing the method, and to a verification unit and a validation unit.

BACKGROUND INFORMATION

Programmable control devices are used in machines and vehicles in order to control the latter or components thereof. For example, a motor vehicle may contain control devices for engine control, for the brake system, etc. The control devices usually comprise at least one processor having one or more processor cores. In these processor cores, control software is executed, i.e., computer programs stored in a memory are executed in order to achieve the control function of the control device. For security reasons, it may be provided that the integrity of computer programs is checked by the control device using, for example, a hardware security module, in order to prevent a manipulated computer program, i.e., the stored program code thereof, from being executed. In particular, cryptographic functions can be used for this purpose.

SUMMARY

According to the present invention, a method for remote verification of the integrity of a computer program in a computing unit to be checked, and a system for performing the method, and a verification unit and a validation unit are provided. Advantageous embodiments of the present invention are disclosed herein.

According to an example embodiment of the present invention, a verification unit is used. In this case, the verification unit selects a pair from a list of pairs in which each pair comprises a random character string and a reference check value and transmits the random character string of the selected pair to a validation unit. The validation unit receives and compares a comparison check value calculated by means of the check value function based on the random character string transmitted (by the calculation unit) and the stored program code to the reference check value of the selected pair and verifies the integrity of the stored program code if they are equal. The same check function is used to calculate the reference check values and the comparison check values. Storing reference check values or secret keys in the computing unit to be checked is not necessary. This is advantageous since an integrity check of computer programs for computing units to be checked that do not have a root of trust, such as a hardware security module (HSM) or trusted platform module (TPM), or in which said root of trust is compromised by hardware or software errors can thus be performed and verified.

If the comparison check value is not equal to the reference check value, the integrity of the stored program code is not verified. Likewise, the integrity of the stored program code is preferably not verified if no comparison check value is received. That is to say, the method preferably comprises, in particular as part of the step of receiving the comparison check value, a waiting after the transmission until the comparison check value is received or a predetermined maximum time period has elapsed (i.e., waiting until either of the two is satisfied), wherein the integrity of the stored program code is not verified if the comparison check value is not received within the predetermined maximum time period.

The computer program whose integrity is to be verified is present in the form of a program code or of program data, wherein the term "program code" is to include both executable computer instructions and data required during execution. The "reference program code" is the correct, unmanipulated program code. The "stored program code" is the program code that is stored in the computing unit (referred to as "computing unit to be checked") and that may be manipulated or altered in comparison to the reference program code.

The verification unit and the validation unit mentioned herein may be implemented as hardware (processor cores, memory, . . . ) or hardware module in a computing unit and/or as a software module (computer program module) executed in a computing unit. The verification unit is embodied as a computing unit independent of the computing unit to be checked. The verification unit may be comprised in the same vehicle or in the same machine as the computing unit to be checked. The verification unit may in particular also be implemented in a computer system (e.g., server, cloud server, or the like) different from the validation unit. The validation unit is preferably implemented within the computing unit to be checked. However, the validation unit may also be independent of the computing unit to be checked, e.g., be implemented in a vehicle in another control device, if the computing unit to be checked is a control device of the vehicle. By means of the check function, a check value is calculated based on a character string and a program code. The check function can generally be considered as a mapping that maps the two input values (character string, program code) to an output value (check value); check value=f(character string, program code), wherein f is the check function. Alternatively, or in particular, the check function may be considered as a mapping that maps an input value formed from the character string and the program code, for example by concatenation, to an output value (check value); e.g., check value=f(character string | | program code). The term "check function" is to be understood in a general sense so that both possibilities are encompassed, wherein further possibilities are, of course, also possible and are to be encompassed by the term "check function." Since the lengths of the character string and of the program code are generally indeterminate, the check function should in any case be able to evaluate input values of any lengths (for example, by block evaluation or block calculation).

A hash function, in particular a cryptographic hash function, can be used as the check function for calculating the check values; the check values can then be considered hash values. Furthermore, the check function may comprise applying at least one hash function, in particular at least one cryptographic hash function, once or multiple times.

A cryptographic hash function used should have one or more of the following characteristics:

each calculated hash value should have a particular fixed length, regardless of the length of the entered character string;

collision resistance: i.e., it is not practical to find two different input values that result in the same hash value; not practically reversible;

avalanche effect: the hash values of two inputs that differ only slightly, e.g., by one bit, should be very different.

"Not practically" is to mean that a very high amount of time and/or computational effort would be required. Suitable cryptographic hash functions are, for example, hash functions according to SHA-1 or SHA-2, i.e., SHA-224, SHA-256, SHA-384, SHA-512, SHA-512/224, and SHA-512/256, which are described, for example, in the document FIPS PUB 180-4 (http://dx.doi.org/10.6028/NIST.FIPS.180-4) of the NIST (National Institute of Standards and Technology) or also from RFC 6234. The length of the hash values is 160 bits for SHA-1 and 224, 256, 384, or 512 bits for hash functions of the SHA-2 family. Likewise possible is also the use of MD5 (Message-Digest Algorithm 5, RFC1321), length 128 bits, or SHA-3 (FIPS PUB 202, http://dx.doi.org/10.6028/NIST.FIPS.202), length of 224, 256, 384, 512 bits depending on version or any desired length.

An example of a check function that comprises applying a cryptographic hash function is HMAC (hash-based message authentication code) according to RFC2104 or FIPS PUB 198 (http://csrc.nist.gov/publications/fips/fips198-1/FIPS-198-1_final.pdf). HMAC comprises applying a hash function multiple times, in particular one of the aforementioned cryptographic hash functions. More generally, a different message authentication code (MAC) with a key (random character string) and a message (program code) included in the mapping thereof may also be used. The HMAC mapping or the MAC mapping of a key (random character string) and a message (program code) to an authentication code (check value) accordingly represent check functions.

Each random character string (also referred to as a character string in simplified terms) is any sequence or string of characters (e.g., bits or even corresponding decimal, hexadecimal representations, or the like). The random character strings of the list are to be independent of one another; for example, they should not be consecutive numbers. From the knowledge of one random character string of the list or its pairs, it thus cannot be inferred which further random character strings are included in the list. This is to be indicated by the term "random." Typically, the characters of each character string are randomly selected.

The list of pairs should only be known to or stored by the verification unit. In this respect, it should be ensured that the list is not known outside the verification unit so that, in particular, attackers who manipulate the stored computer code do not know the list. The validation unit and the computing unit to be checked likewise do not know the list.

According to an example embodiment of the present invention, preferably, the verification unit marks the selected pair as no longer selectable or deletes it from the list, and/or in the case of multiple executions (of the integrity check starting with the selection up to and including the comparison), each pair is selected by the verification unit at most once. The pair should obviously be deleted from the list only after the reference check value has been evaluated, e.g., has been temporarily stored until after the comparison, or only after the comparison. This configuration can prevent so-called replay attacks since a different random character string is used with each remote verification and a different check value thus occurs each time, provided that a suitable check value function (hash function with an avalanche effect) is used to calculate the check value. More preferably, the selected pair is marked as no longer selectable or is deleted from the list immediately after the transmission of the random character string. In the case of deletion, the reference check values are temporarily stored until the comparison check value has been received, wherein a maximum time interval within which waiting for the reception takes place is specified. Likewise more preferably, in the case of multiple executions, each pair the random character string of which has been transmitted once, is selected by the verification unit at most once, i.e., a re-selection of a pair is prevented as soon as the random character string comprised in the pair has been transmitted once.

According to an example embodiment of the present invention, preferably, the list of pairs is generated by a programming unit that stores the reference computer program in the computing unit or transmits it to the computing unit and causes it to be stored, and is transmitted to the verification unit. Since the programming unit has the reference program code, it can expediently generate the list of pairs in a tamper-proof manner when the program code is stored in the computing unit to be checked.

According to an example embodiment of the present invention, preferably, the method comprises transmitting, by the verification unit, a result of whether or not the integrity is verified, to a data communication unit that is configured for data communication with the computing unit to be checked (i.e., sending a message comprising a content that indicates whether or not the integrity is verified or has been verified); and sending, by the data communication unit, data to the computing unit to be checked as a function of the result; and/or using, by the data communication unit, data received from the computing unit to be checked as a function of the result. For example, if manipulation is assumed (in the sense of the remote verification), the data communication unit can discard data from the computing unit to be checked for security reasons in order to avoid malfunctions. Furthermore, it may be provided that if the data communication unit does not receive a result from the verification unit (e.g., within a maximum time interval), the data communication unit determines or assumes as a result (as a function of which data is sent or used) that the integrity is not verified.

According to an example embodiment of the present invention, preferably, the method comprises receiving, by the validation unit, the random character string transmitted or sent by the verification unit; calculating, by the validation unit, a comparison check value based on the received random character string and the stored program code by means of the check value function; and transmitting or sending, by the validation unit, the comparison check value to the verification unit. This configuration is expedient for determining the comparison check value.

According to example embodiment of the present invention, preferably, if the integrity is not verified, the verification unit transmits to the validation unit that the integrity is not verified, and the validation unit prevents the execution of the stored program code or causes the prevention of the execution of the stored program code, and/or the validation unit prevents the use of particular functionalities of the computing unit or causes the prevention of the use of particular functionalities of the computing unit, and/or the validation unit and/or the verification unit stores an error message in a log and/or sends it to a remote monitoring unit. If the validation unit prevents the execution of the stored program code or causes prevention of the execution of the stored program code, the validation unit and/or the computing unit to be checked should have a corresponding functionality. Implemented, for example, by a security module (e.g., HSM) or the like. For example, if the validation unit is not part of the computing unit to be checked, the computing unit to be checked may comprise such a security module, and the validation unit may send the latter an instruction to prevent the execution of the stored program code, i.e., the validation unit causes the prevention. For example, if the validation unit is part of the computing unit to be checked, in particular if the validation unit comprises such a security module, the validation unit may directly prevent the execution of the stored program code. The prevention of the use of particular functionalities of the computing unit refers to only a limited range of functions of the computing unit being used if the integrity is not verified.

According to an example embodiment of the present invention, preferably, the validation unit is configured to read out a memory area in which the stored program code is stored in the computer to be checked; and/or the computing unit to be checked is configured to transmit, to the validation unit, the content of the memory area in which the stored program code is stored in the computer to be checked, in response to a corresponding query from the validation unit. This is in particular expedient if the validation unit is not implemented in the computing unit to be checked.

According to an example embodiment of the present invention, preferably, the method comprises supplementing the list with at least one new pair, wherein the verification unit transmits a request to generate the at least one new pair for the list, to the validation unit, the validation unit calculates at least one new reference checksum based on at least one new random character string and the stored program code by means of the check value function, the validation unit transmits the at least one new pair, which comprises the at least one new random character string and the at least one new reference checksum, to the verification unit, and the verification unit supplements the list with the transmitted at least one new pair, wherein the at least one new random character string is generated by the verification unit and transmitted to the validation unit with the request or is generated by the validation unit, wherein in particular the at least one new random character string is generated as at least one string of randomly selected characters. The term "supplementing" also includes supplementing an empty list with entries or pairs. An empty list may, for example, be given if only a single use of each pair is allowed and all pairs are "used up," i.e., have been used. This may also be the case immediately after programming, i.e., writing of the program code into the memory of the computing unit to be checked, for example during the manufacture of the vehicle, or the machine, in which the computing unit to be checked is used or during the installation of the computing unit to be checked. During programming, it may be assumed that the stored program code is unmanipulated since this is done in a secure environment.

According to an example embodiment of the present invention, more preferably, supplementing the list is performed if (or after) the integrity is verified, and/or is not performed if the integrity is not verified. If only a single use of each pair is allowed, the case may occur that only one pair or a few pairs in the list have not yet been used. Accordingly, before all pairs have been used, supplementing may be provided, wherein since this only takes place if the integrity has been verified, it is ensured that the stored program code based on which the new reference check values are calculated is unmanipulated. The request to generate new pairs should take place within as short a time period as possible after the verification of the integrity so that manipulation within this short time period is unlikely or even excluded, e.g., if the time period is shorter than a time period necessary for writing new program code. If the computing unit to be checked has a security module, or the like, that has corresponding functionalities, it can be provided that the computing unit to be checked is set to a secured state (memory protection), in which writing or reprogramming program code in the computing unit to be checked is prevented if or as soon as the integrity is being verified or with the request, and is only allowed again after the at least one new reference checksum has been calculated.

A system according to the present invention is configured to perform the method according to the present invention. A verification unit or validation unit according to the present invention is configured (in particular in terms of the program technology) to perform the steps of the method according to the present invention that are provided to be performed by the verification unit or validation unit.

The implementation of a method according to the present invention in the form of computer programs or computer program modules or computer program products with program code for performing all method steps is also advantageous since this incurs particularly low costs, in particular if the executing computing unit is also used for further tasks. Lastly, a machine-readable storage medium with a computer program or computer program module stored therein and as described above is provided. Suitable storage media or data carriers for providing the computer program are in particular magnetic, optical and electrical memories, such as hard disks, flash memory, EEPROMs, DVDs, etc. Downloading a program via computer networks (internet, intranet, etc.) is also possible. Such a download can be wired or cabled or wireless (e.g., via a WLAN, a 3G, 4G, 5G, or 6G connection, etc.).

Further advantages and embodiments of the present invention emerge from the description herein and the figures.

The present invention is illustrated schematically in the figures on the basis of exemplary embodiments and is described below with reference to the figures.

DETAILED DESCRIPTION OF EXAMPLE EMBODIMENTS

Figure 1:
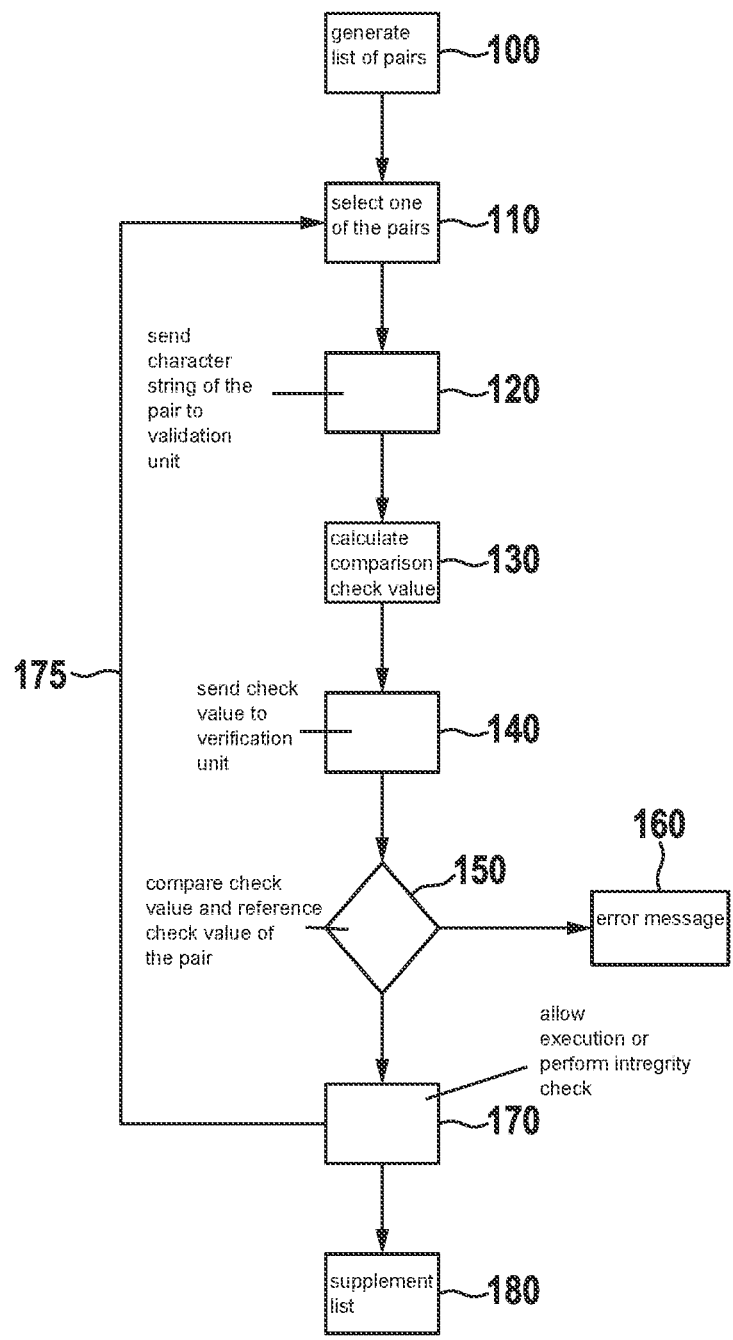
FIG. 1 shows a flow chart according to a preferred embodiment of the present invention.

FIG. 1 shows a flow chart according to a preferred embodiment of the present invention.

In an optional step 100, when programming a computing unit (computing unit to be checked later) with the computer program or storing/writing the reference program code of the computer program, a list of pairs, each comprising (or consisting of) a character string and a reference check value, is generated, for example by a programming unit, and is stored by a verification unit (i.e., stored in a memory of the verification unit and/or stored in a memory to which the verification unit has access). In this case, the programming unit having the reference program code calculates the reference check value of each pair by means of a check function (in particular hash function) based on the reference program code and the random character string of the respective pair. The random character strings are randomly selected. For example, the number of pairs in the list may be selected depending on the planned duration of use of the computing unit to be checked and/or the integrity check frequency. For example, the list may comprise a few to a few hundred or a few thousand pairs. The further steps relate to the integrity verification during the regular use of the computer program in the computing unit to be checked.

In step 110, the verification unit selects one of the pairs of the list of pairs, e.g., randomly or according to an order of the list items. Preferably, in the case of multiple executions, each pair is selected at most once. In a step 120, the character string contained in the selected pair is transmitted or sent by means of a data connection (e.g., cellular connection) to a validation unit, which receives the character string.

In the preferred step 130, the validation unit calculates a comparison check value by means of the check function based on the transmitted or received character string and the program code stored in the computing unit to be checked. For this purpose, the validation unit should have direct or indirect access to the memory area, in which the program code is stored, of the computing unit to be checked. Direct access may be given if the validation unit is comprised in the computing unit to be checked or if direct memory access (DMA) is given. Indirect access may be given, for example, in that the computing unit to be checked is configured to transmit the content of this memory area to the validation unit in response to a corresponding query (memory area query).

In the preferred step 140, the calculated comparison check value is transmitted or sent by the validation unit to the verification unit, which receives it.

In step 150, the verification unit performs a comparison between the transmitted or received comparison check value and the reference check value of the pair selected in step 110. If the comparison check value is equal to the reference check value, it is assumed that the stored program code is unaltered or unmanipulated, i.e., the integrity of the stored program code is thus verified. Otherwise, i.e., if the comparison check value is not equal to the reference check value, the integrity of the stored program code is not verified. This verification or non-verification takes place in the sense of the check function, i.e., the check function should have the characteristic that different inputs lead to different outputs so that if the stored program code has been changed in comparison to the reference program code, the check values do not match. Since the character string, which is different for different integrity checks, is additionally included, it is ensured, in particular if each pair of the list is used at most once, that it is detected if already determined (pre-manipulation, correct) comparison check values are recorded by an attacker and reproduced later (after manipulation) (so-called replay attack). If no comparison check value is received within a maximum time period after transmitting the random character string, the integrity is likewise not verified, i.e., manipulation is assumed.

In a preferred step 160, if the integrity is not verified, an error message or the like may be generated, which is, for example, logged or sent to a monitoring unit. In particular, prevention of the execution of the stored program code may also be provided in this case (e.g., if a security module with suitable functionality is provided in the computing unit to be checked).

On the other hand, if the integrity is verified, the execution of the stored program code is allowed in a preferred step 170. Optionally, after step 170, it may be provided that the method, i.e., the integrity verification, is performed again, i.e., a jump back to step 110 may occur (arrow 175). This may, for example, take place at regularly or randomly selected points in time.

Figure 2A:
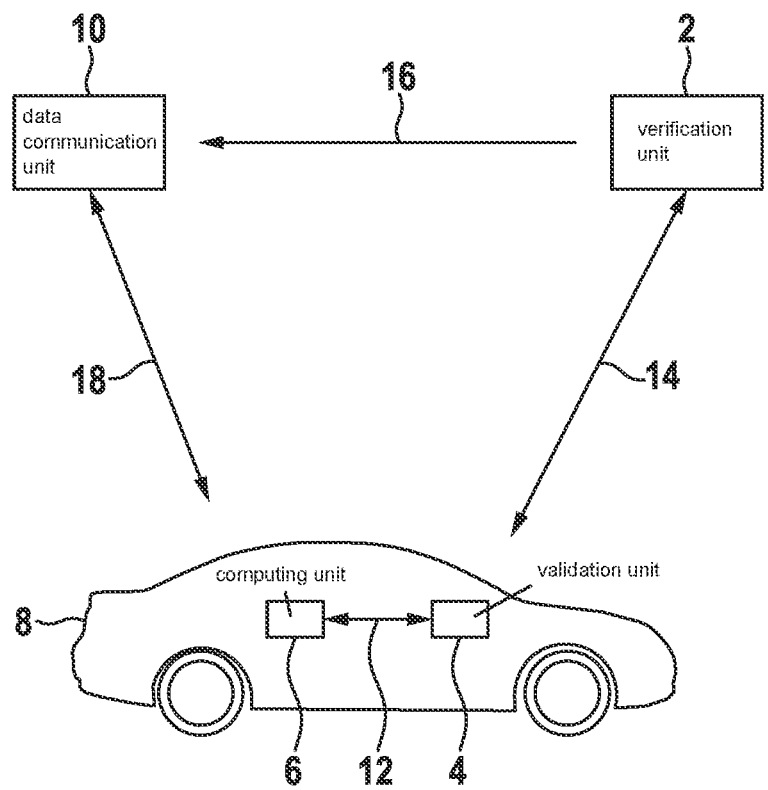
FIGS. 2A, 2B schematically show systems comprising a verification unit and a validation unit used for the integrity check of a computer program stored in a computing unit to be checked, according to example embodiments of the present invention.
Figure 2B:
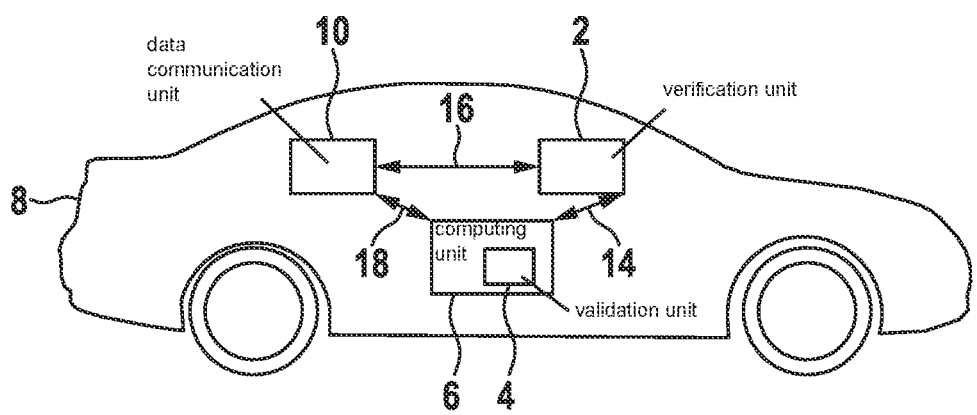

In both cases (steps 160, 170), it could additionally or alternatively also be provided that a message with the result of the integrity check is transmitted or sent to another computing unit (e.g., the data communication unit in FIG. 2A or FIG. 2B).

In a preferred step 180, the list may be supplemented with one or more new pairs (with new character strings and new reference check values). It is assumed here that an unmanipulated state of the computing unit to be checked is present (e.g., after the integrity of the stored program code has been verified). For example, the new character strings are randomly selected by the verification unit or the validation unit. The validation unit calculates the new reference check values by means of the check function based on the new character strings and the stored program code. The new pairs are subsequently transmitted to the verification unit, and the latter supplements the list with the new pairs, i.e., new list entries are generated. In step 110 or instead of the procedure described there for generating the list, the procedure according to step 180 could likewise be used there.

FIG. 2A schematically shows a system comprising a (remote) verification unit 2 and a validation unit 4, which are used for the integrity check of a computer program stored in a computing unit 6 to be checked. The verification unit 2, the validation unit 4, and the computing unit 6 to be checked are configured to perform the respectively relevant steps of the method for remote verification of the integrity of a computer program.

The computing unit 6 to be checked is, by way of example, a control device of a vehicle 8. The validation unit 4 is likewise provided in the vehicle 8 and can exchange data with the validation unit 4 via a wired or wireless connection (arrow 12). For example, the validation unit 4 and the computing unit 6 to be checked could be connected via Ethernet or a CAN bus (CAN: controller area network). The validation unit 4 may be a validation unit specifically provided for the implementation of the method according to the present invention or may be included in a computing unit that is also used for other functions. The validation unit 4 could in particular be included in the computing unit 6 to be checked. The illustrated embodiment, in which the validation unit 4 is separate from the computing unit 6 to be checked, is expedient if the computing unit to be checked does not have sufficient resources (computing power, memory) to be able to itself act as a validation unit, in particular insufficient resources to calculate the comparison check value by means of the check function. If separately embodied as shown, the validation unit 4 should be able to read out the memory area, in which the program code is stored, of the computing unit 6 to be checked or the computing unit 6 to be checked should be able to transmit this memory area (or data stored therein) to the validation unit 4. In contrast to what is shown, it is, in principle, also possible that the validation unit 4 is not located in the vehicle 8, or more generally in a machine, that is controlled by the computing unit 6 to be checked.

The verification unit 2, for example a computer system or server, is remote from the computing unit 6 to be checked and the validation unit 4. The verification unit 2 is connected to the validation unit 4 for data exchange (arrow 14). A wireless connection, e.g., a cellular connection, is preferably used for this purpose.

Furthermore, a data communication unit 10 is shown, which is configured to communicate data with the computing unit 6 to be checked. These data may be data sent by the data communication unit 10 to the computing unit 6 to be checked in order to be used by the latter, and/or data sent by the computing unit 6 to be checked to the data communication unit 10 in order to be used by the data communication unit. The data communication unit 10 can perform the data communication (arrow 18) with the computing unit to be checked as a function of the result of the integrity check. For this purpose, the result of whether or not the integrity has been verified is sent by the verification unit 10 [sic; 2] to the data communication unit 10 (arrow 16). In particular, it may be provided that particular data will only be sent by the data communication unit 10 to the computing unit 6 to be checked if the integrity has been verified (otherwise, no or other data will be sent). It may also be provided that data sent by the computing unit 6 to be checked to the data communication unit 10 will not be used or will only be used to a limited extent (i.e., particular computer programs) by the data communication unit.

If, as shown, the computing unit 6 to be checked is used as a control device in a vehicle 8, the data communication unit 10 could, for example, be a control device of another vehicle or a computing system that processes data relating to a particular geographic region (so-called edge server). In this case, the data could relate to autonomous driving functions, which are, e.g., carried out cooperatively, wherein the data communication unit 10 uses data transmitted by the computing unit 6 to be checked only if the integrity has been verified, since manipulation that could lead to hazards in connection with the autonomous driving function could otherwise be present.

In FIG. 2A, the verification unit 2 and the data communication unit 10 are located outside of the vehicle 8. They may also be located in the vehicle 8 independently of one another. FIG. 2B shows the case that both are located in the vehicle 8. Additionally, in FIG. 2B, the validation unit 4 is comprised, by way of example, in the computing unit 6 (to be checked), e.g., as a security module or hardware security module of the computing unit 6.

The verification unit 2 may be considered as a central verification computing unit in the vehicle 8, said verification computing unit verifying the integrity of program code in computing units to be checked, for example if the computing unit to be checked fails to satisfy hardware requirements for performing integrity checks itself. The data communication unit could, for example, be a control device of the vehicle 8, said control device exchanging data with the computing unit 6 to be checked, which may likewise be a control device of the vehicle. The connections for data exchange between the verification unit 2, the validation unit 4 or the computing unit 6 to be checked (the validation unit 4 used as a component of the computing unit 6 to be checked, in particular the communication interfaces thereof) and the data communication unit 10 are preferably wired, e.g., via Ethernet or a CAN bus, in the configuration of FIG. 2B.

Besides the arrangement of the verification unit 2, the data communication unit 10, and the validation unit 4 and their data exchange connection, the statements regarding FIG. 2A continue to apply so that the description is not repeated here, but rather reference is made to the description of FIG. 2A.

What is claimed is:

1. A method for remote verification of an integrity of a computer program in a computing unit to be checked using a verification unit, wherein the computer program is specified by a reference program code and is present in a form of stored program code in the computing unit to be checked, the method comprising:
    selecting, by the verification unit, a pair from a list of pairs in which each respective pair of the pairs includes a random character string and a reference check value calculated using a check value function based on the random character string of the respective pair and the reference program code;
    transmitting, by the verification unit, the random character string of the selected pair to a validation unit;
    receiving, by the verification unit, a comparison check value calculated using the check value function based on the transmitted random character string and the stored program code;
    comparing, by the verification unit, the received comparison check value to the reference check value of the selected pair, wherein the integrity of the stored program code is verified when the received comparison check value is equal to the reference check value of the selected pair, and is not verified when the received comparison check value is not equal to the reference check value of the selected pair.

2. The method according to claim 1, wherein the verification unit marks the selected pair as no longer selectable or deletes it from the list; and/or wherein, when multiple executions occur, each pair is selected at most once by the verification unit.

3. The method according to claim 1, further comprising:
    waiting after the transmission of the random character string until the comparison check value is received or a predetermined maximum time period has elapsed, wherein the integrity of the stored program code is not verified when the comparison check value is not received within the predetermined maximum time period.

4. The method according to claim 1, wherein the list of pairs is generated by a programming unit that stores the reference computer program in the computing unit or transmits it to the computing unit and causes it to be stored, and the list of pairs is transmitted to the verification unit.

5. The method according to claim 1, further comprising:
    transmitting, by the verification unit, a result of whether or not the integrity is verified, to a data communication unit configured for data communication with the computing unit to be checked; and
    performing at least one of:
        sending, by the data communication unit, data to the computing unit to be checked as a function of the result, or
        using, by the data communication unit, data received from the computing unit to be checked as a function of the result.

6. The method according to claim 1, further comprising:
    receiving, by the validation unit, the random character string transmitted or sent by the verification unit;
    calculating, by the validation unit, a comparison check value using the check value function based on the received random character string and the stored program code;
    transmitting or sending, by the validation unit, the comparison check value to the verification unit.

7. The method according to claim 1, wherein: the check value function is applied to a character string obtained by concatenating the random character string and the reference program code or the stored program code, and/or wherein the check value function includes a cryptographic hash function; and/or the check value function is implemented as a message authentication code.

8. The method according to claim 1, wherein, when the integrity is not verified: the verification unit transmits, to the validation unit, that the integrity is not verified and the validation unit prevents execution of the stored program code or causes a prevention of the execution of the stored program code, and/or the validation unit prevents use of particular functionalities of the computing unit or causes a prevention of the use of particular functionalities of the computing unit, and/or the validation unit and/or the verification unit stores an error message in a log and/or sends the error message to a remote monitoring unit.

9. The method according to claim 1, wherein the validation unit is a hardware module in the computing unit to be checked and/or a software module executed on the computing unit to be checked.

10. The method according to claim 1, wherein the validation unit is a hardware module in a validation computing unit and/or a software module executed on the validation computing unit, and wherein the validation computing unit is different from the computing unit to be checked.

11. The method according to claim 1, wherein: the validation unit is configured to read out a memory area in which the stored program code is stored in the computing unit to be checked, and/or the computing unit to be checked is configured to transmit content of the memory area in which the stored program code is stored in the computing unit to be checked, to the validation unit in response to a corresponding query from the validation unit.

12. The method according to claim 1, further comprising supplementing the list with at least one new pair, wherein:
the verification unit transmits a request to generate the at least one new pair for the list, to the validation unit;
the validation unit calculates at least one new reference checksum using the check value function based on at least one new random character string and the stored program code;
the validation unit transmits the at least one new pair including the at least one new random character string and the at least one new reference checksum, to the verification unit; and
the verification unit supplements the list with the transmitted at least one new pair;
wherein the at least one new random character string is generated by the verification unit and transmitted to the validation unit with the request, or is generated by the validation unit; and
wherein, the at least one new random character string is generated as at least one string of randomly selected characters.

13. The method according to claim 12, wherein the supplementing of the list is performed when the integrity is verified, and/or is not performed when the integrity is not verified.

14. A verification unit for remote verification of an integrity of a computer program in a computing unit to be checked, wherein the computer program is specified by a reference program code and is present in a form of stored program code in the computing unit to be checked, wherein the verification unit is configured to:
select a pair from a list of pairs, wherein each respective pair includes a random character string and a reference check value calculated using a check value function based on the random character string of the respective pair and the reference program code;
transmit the random character string of the selected pair to a validation unit;
receive a comparison check value from the validation unit;
compare the received comparison check value with the reference check value of the selected pair;
verify the integrity of the stored program code if the transmitted comparison check value is equal to the reference check value of the selected pair, and not verify the integrity of the stored program code if the transmitted comparison check value is not equal to the reference check value of the selected pair.

15. A system for remote verification of an integrity of a computer program in a computing unit to be checked, wherein the computer program is specified by a reference program code and is present in a form of stored program code in the computing unit to be checked, the system comprising:
a verification unit; and
a validation unit;
wherein the system is configured to:
select, using the verification unit, a pair from a list of pairs in which each respective pair of the pairs includes a random character string and a reference check value calculated using a check value function based on the random character string of the respective pair and the reference program code;
transmit, using the verification unit, the random character string of the selected pair to the validation unit;
receive, using the verification unit, a comparison check value calculated using the check value function based on the transmitted random character string and the stored program code;
compare, by the verification unit, the received comparison check value to the reference check value of the selected pair, wherein the integrity of the stored program code is verified when the received comparison check value is equal to the reference check value of the selected pair, and is not verified when the received comparison check value is not equal to the reference check value of the selected pair.

* * * * *